J. B. HOOBER.
RIDING HARROW.
APPLICATION FILED FEB. 11, 1910.
988,193.
Patented Mar. 28, 1911.
2 SHEETS—SHEET 1.
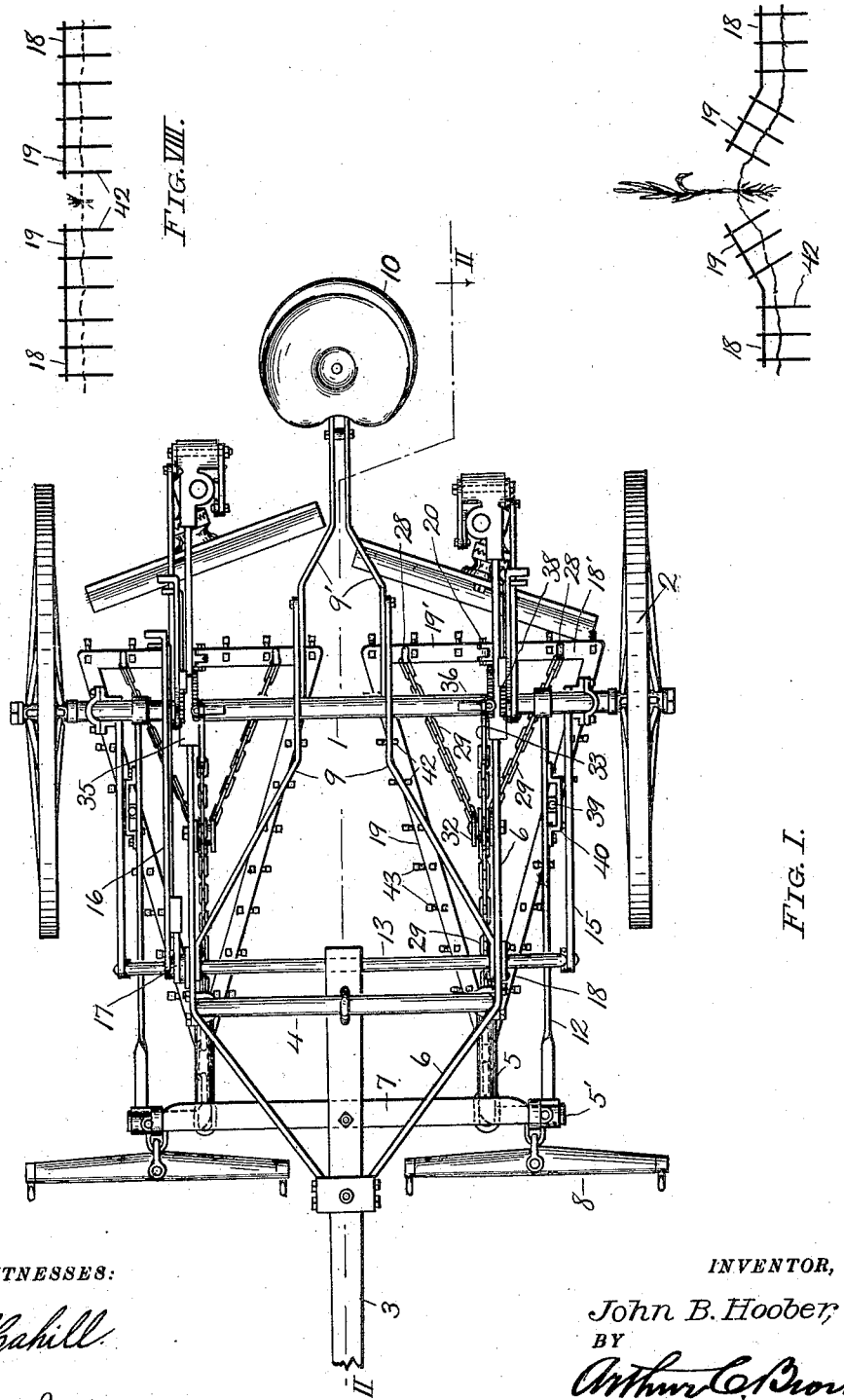
WITNESSES:
INVENTOR,
John B. Hoober,
BY
ATTORNEY.

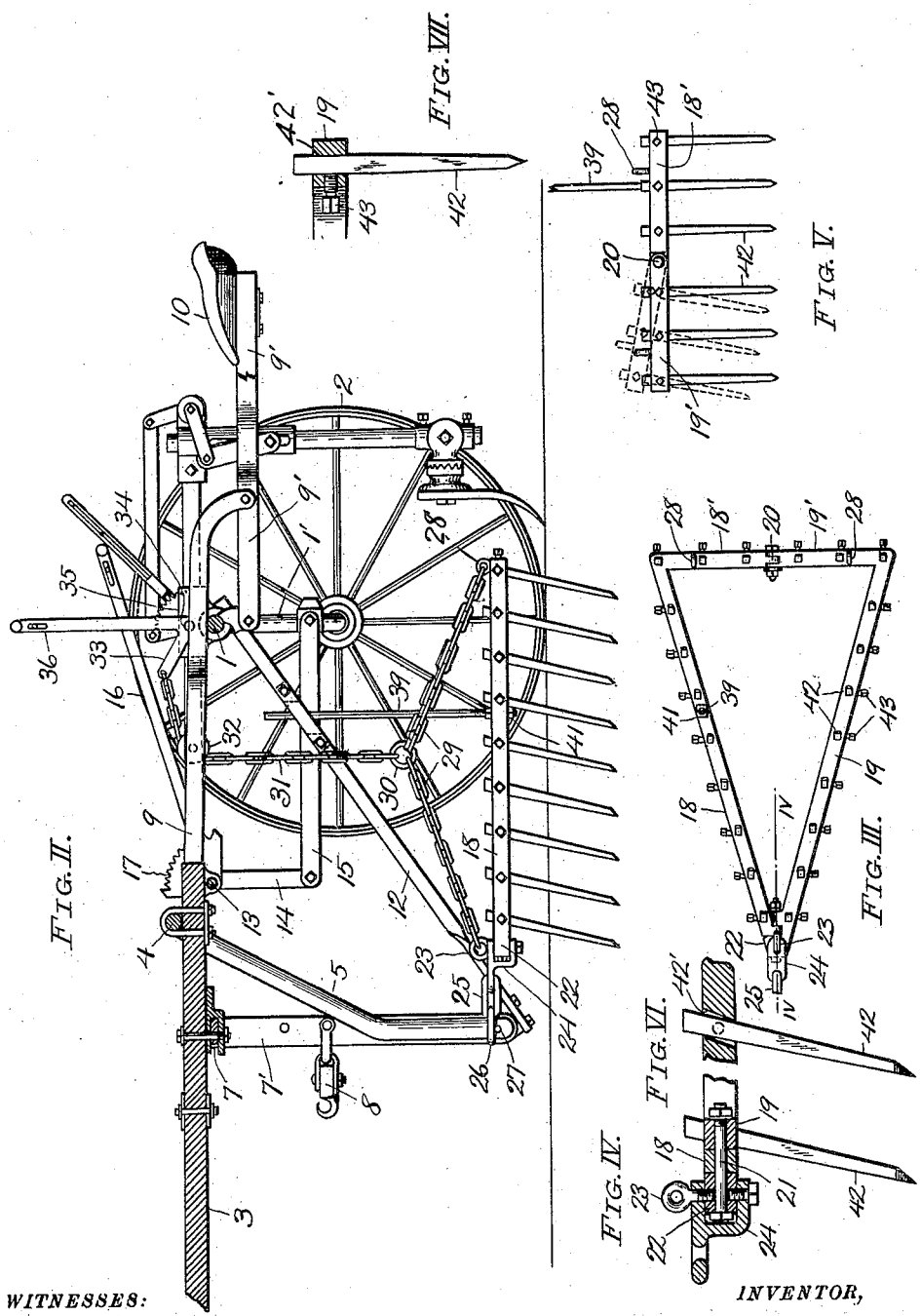

UNITED STATES PATENT OFFICE.

JOHN B. HOOBER, OF KANSAS CITY, MISSOURI.

RIDING-HARROW.

988,193.  Specification of Letters Patent.  Patented Mar. 28, 1911.

Application filed February 11, 1910. Serial No. 543,230.

*To all whom it may concern:*

Be it known that I, JOHN B. HOOBER, a citizen of the United States, residing at Kansas City, in the county of Jackson and State of Missouri, have invented certain new and useful Improvements in Riding-Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to riding harrows, and has for its chief object to provide an implement of this class, by the use of which a field may be harrowed earlier in the season and to a greater depth than is possible with ordinary riding harrows.

A further object is to provide a harrow that shall automatically adjust itself to the sides of a ridge or "hill", and also to irregularities in the surface of the ground.

A further object is to provide a harrow frame having vertically adjustable harrow teeth affixed therein, so that the soil may be harrowed to different depths according to the judgment of the user and the condition of the field.

These and other desirable objects are attained by the construction hereinafter described, pointed out in the claims, and illustrated in the accompanying drawings, in which:—

Figure I is a plan view of a two-horse riding harrow constructed according to my invention, showing also certain cultivating devices. Fig. II is a side elevation, partly in vertical section on the line II—II of Fig. I. Fig. III is a top plan view of one of the harrows, omitting the chains. Fig. IV is a detail sectional view on the line IV—IV of Fig. III. Fig. V is a rear elevation of the harrow shown in Fig. III, showing one side thereof raised, in dotted lines. Figs. VI and VII are detail views of one harrow tooth, the frame being in section. Fig. VIII is a diagram of the harrow when working in level soil, and Fig. IX is a similar diagram showing the harrow straddling a row of plants.

Referring more in detail to the parts:— The main frame of the harrow comprises the arched axle 1, the wheels 2, the tongue 3, the front arch 4—5, and lateral bars 6, which latter connect the tongue to the axle and pass to each side of the front arch 4—5. Pivoted under the tongue is a doubletree 7, having secured thereto, lateral vertical bars 7' on which are mounted swingletrees 8 for harness attachment. Secured to the bars 6, and extending rearwardly and resting on the axle 1, are a pair of bars 9 to which are secured two bars 9' which support the driver's seat 10. The lower ends of the depending parts 5 of the front arch 4—5 are bent outwardly as shown at 5', and said parts 5' are connected by braces 12 with the axle 1.

Mounted in bearings on the frame member 6 is a rock shaft 13, having a hand lever 16 having a latch (not shown) engaging the toothed sector 17 which is fixed to the frame 6. Fixed on this rock-shaft are two depending levers 14 which are connected by links 15 with the downturned parts 1' of the axle 1, and through which the parts 1' may be shifted from the hand lever 16.

The construction so far described is not claimed as a part of my invention, but is especially adapted for use in conjunction therewith.

18—19 designates each of the two harrow frames, and as they may be identical in construction, a description of one will suffice for both.

The frame 18—19 is made triangular, comprising forwardly converging bars 18, 19, having their rear ends turned inwardly toward each other. At some point between the rear corners of the frame, preferably midway, the transverse parts 18', 19' are connected together with a knuckle hinge 20, the pin of which is parallel to the longitudinal axis of the frame, the forward ends of bars 18, 19 being pivotally connected together by a pin 21 which is substantially alined with the rear pin 20.

One of the bars, 19, is provided adjacent the pivot 21, with a knuckle 22, through which passes a vertical eyebolt 23, and mounted on said knuckle and bolt is a clevis 24, loosely connected by a link 25 with a link 26 which is mounted on the lower end of the arch leg 5 and supported by a cotter 27. Each rear frame part 18', 19' is provided with an eyebolt 28. From the three eyes 23, 28, respective chains 29 are connected to a centrally disposed ring 30, supported above the harrow by a chain 31 which